United States Patent Office 3,404,573
Patented Oct. 8, 1968

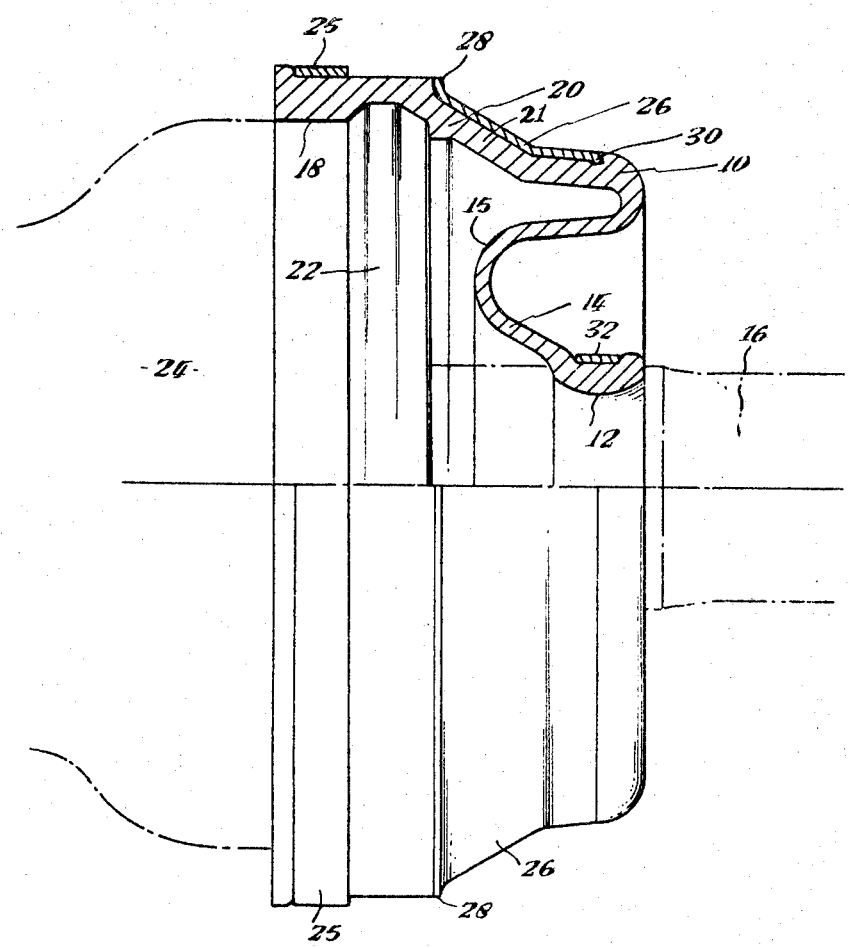

3,404,573
SEAL
William Cull, Hest Bank, near Lancaster, and Godfrey Roy Holmes, Castle Bromwich, England, assignors to Hardy Spicer Limited, London, England, a company of Great Britain and Northern Ireland
Filed Aug. 22, 1966, Ser. No. 574,043
Claims priority, application Great Britain, Aug. 24, 1965, 36,355/65
10 Claims. (Cl. 74—18)

ABSTRACT OF THE DISCLOSURE

A diaphragm seal for a universal joint is formed of resilient material such as rubber and has a diaphragm part secured to the shaft and an integral extension portion secured to the bell of the joint, the extension portion being reinforced by an outer rigid member preferably of frusto-conical form with the wider end towards the bell. The outer reinforcing member and the underlying part of the extension portion is angularly displaceable with respect to the bell. The outer rigid reinforcing member, inter alia, overcomes the effect of centrifugal force on the seal and holds the resilient material away from the interengaging parts of the universal joint.

---

This invention relates to a seal for universal joints especially constant velocity universal joints.

When a constant velocity joint is used for the drive shafts of front wheel drive vehicles the speed of the joint is limited to that of the road wheel, which is normally relatively low—rarely exceeding 1,500 revolutions per minute (r.p.m.) In such cases the sealing of the joint is comparatively simple, some form of bellows or convoluted seal being commonly used.

However, with the steady increase in performance of motor cars having front engine and rear wheel drive, the velocity variations introduced by the Hooke's type of joint normally used on the main fore-and-aft drive shaft are becoming intolerable, and there is a demand for constant velocity joints. Such joints are required to run at speeds up to 6,000 or even 8,000 r.p.m., at which speeds the bellows or convoluted type of seal is quite unsuitable because of the radial growth, induced by centrifugal force, which acts not only on the seal but on the lubricant which it contains.

Diaphragm seals—that is seals comprising a flexible wall contained between two relatively closely spaced planes normal to the joint axis—are recognised as being the most suitable form for high speed applications in which joint angles of no more than 15–20° occur, but hitherto they have proved difficult to install between the outer member or bell of the joint and the shaft.

It is an object of this invention to provide an improved diaphragm seal for a universal joint.

It is a further object to provide a diaphragm seal formed of a resilient material such as rubber of which at least a part incorporates an outer rigid reinforcing member which will withstand the effects of centrifugal force.

It is a further object to provide a diaphragm seal having a reinforced tapered portion which will not expand under centrifugal force and which serves to reduce the diameter of the seal from the diameter necessary to secure the seal to the outer member or bell of the universal joint to a smaller diameter at which the tapered portion leads into a diaphragm part securable to the shaft.

It is a further object to provide a diaphragm seal having a diaphragm part securable to the shaft at a point well clear of the joint the diaphragm part being able to flex freely as the shaft moves over at an angle in the joint or moves axially.

It is a still further object of the invention to provide a diaphragm seal in which the diaphragm part is integral with a shroud formed of the same resilient material which shroud incorporates an outer rigid reinforcing member, so that the resilient material of both parts of the seal is held away from the outer member of the joint and cannot become trapped between the shaft and the outer member.

Other objects of the invention will be apparent from the following disclosure.

According to this invention we provide a seal of the diaphragm type for a universal joint the joint having an outer member and an inner member or shaft, the seal being formed of resilient material and comprising a diaphragm part securable to the shaft, and an integral extension portion securable to the outer member of the joint, the extension portion incorporating an outer rigid reinforcing member which will withstand the effects of centrifugal force. The invention thus provides a seal in which resilient material in the extension portion is prevented from radial growth by the outer rigid reinforcing member. The latter also holds resilient material in the extension portion away from the outer member while maintaining the correct relative location of the extension portion and the portion securable to the shaft and covering the difference in diameter between the outer member and the diaphragm part securable to the shaft.

In preferred forms the outer rigid reinforcing member may be made of metal or of moulded plastics material and may be at least partly embedded in the resilient material of the seal so that the seal will offer a slightly resilient resistance to accidental or operational angular displacement of the shaft.

An example of a diaphragm seal according to this invention will be described with reference to the accompanying drawing.

A seal 10 is moulded from rubber. Other similar flexible and resilient material could be used. An inner diameter 12 of a portion 14 (which portion constitutes a diaphragm part of the seal) is securable to a shaft 16 of a constant velocity joint while an edge 18 of an extension portion or shroud 20 of the seal 10 fits over a lip 22 on the bell (or outer member) 24 of the constant velocity joint. The edge 18 is secured to the bell by a band 25 of metal or other suitable material.

From the edge 18, the rubber moulding tapers inwardly at an angle of approximately 30°, and then at a much shallower taper to a diameter suitable to form the outer diameter of the portion or diaphragm part 14 with which it is integrally formed. A tapered part 21 of the rubber moulding is encased in a metal reinforcing member 26 which may be bonded to the outside of the rubber at the moulding stage and together form an element of the extension portion or shroud 20. An outer edge 28 of the reinforcing member 26 is turned outwardly to form a shallow flange to ensure radial stability, and an inner edge 30 is turned slightly inward so that it is buried in the rubber. In the preferred form shown in the drawing, there is rubber at either end of the metal reinforcing member 26 which is free to expand slightly under centrifugal force. This eliminates any tendency for the metal member to be dislodged in use but the larger part of the extension portion 20, i.e., the tapered part 21 of the rubber moulding, is prevented from radial growth by the rigid reinforcing member.

The reinforcing member 26 also performs the function of holding the seal (both the extension portion and the diaphragm part) away from the bell (outer member) of the joint and provides for the correct relative location of the diaphragm part 14 and the edge 18 and for the changing diameter of the seal between these two parts. Because it is secured to the tapered part 21 of the rubber moulding which is integral with the diaphragm part 14 of the seal, there is no danger that the diaphragm part will become trapped between the shaft and the end of the extension portion or shroud 20 when the joint is operating at high angles or during handling or storage.

The diaphragm part 14 of the seal is formed as a reentrant bulge 15 of somewhat thinner section than the thickness of the rubber in the extension portion 20, the inner diameter 12 being shaped to fit in a locating groove in the shaft 16 and to receive a securing band 32. The inner diameter 12 is fitted on the shaft well clear of the joint to avoid risk of interference with the joint when the joint is operated at an angle. It will be seen that a larger portion of the diaphragm part lies axially within the outer rigid reinforcing member.

The inward bulge of the seal allows the diaphragm to flex freely as the shaft moves over at an angle in the joint. It also allows the diaphragm to accommodate slight axial movement of the shaft in the joint, e.g., the axial movement or "plunge" produced when the effective length of the shaft alters between bump and rebound movements of the springs of the vehicle. However, the part which is most subject to the effects of centrifugal force at high speed is kept in a radially stable condition, i.e., is prevented from radial growth by the metal reinforcement. A substantial section of rubber protects the diaphragm part 14 of the seal from the edge of the reinfrocement if the shaft is moved beyond the maximum designed angle.

What is claimed is:

1. A seal of the diaphragm type for a universal joint, the joint having an outer member and an inner member or shaft, the seal being formed of resilient material and comprising a diaphragm part securable to the shaft and an extension portion integral with the diaphragm part and securable to the outer member of the joint, the extension portion incorporating an outer rigid reinforcing member overlying a part of the extension portion to withstand the effects of centrifugal force on said part and which with said part is angularly displaceable with respect to the outer member of the joint during use.

2. A seal according to claim 1 wherein the outer rigid reinforcing member is at least partly embedded in the resilient material of the seal.

3. A seal according to claim 1 wherein the outer rigid reinforcing member and an underlying part of the resilient material of the seal are tapered, an end further from the outer member of the joint being of smaller diameter than the diameter of the end of the reinforcing member nearer the outer member of the joint.

4. A seal according to claim 3 wherein the outer rigid reinforcing member and the underlying resilient material first taper inwardly at an angle of approximately 30° from the end of the outer member of the joint and then taper inwardly at a shallower angle to meet the diaphragm part of the seal.

5. A seal according to claim 3 wherein the extension portion extends beyond each end of the outer rigid reinforcing member and is free at said ends to expand slightly under centrifugal force to prevent any tendency for the reinforcing member to be dislodged in use.

6. A seal according to claim 1 formed of rubber, the outer rigid reinforcing member being formed of metal and being bonded to the outside of the seal during a moulding operation.

7. A seal according to claim 1 wherein the diaphragm part is formed as a reentrant bulge of thinner section than the thickness of the resilient material in the extension portion.

8. A seal according to claim 3 wherein the diaphragm part is formed as a reentrant bulge of thinner section than the thickness of the resilient material in the extension portion.

9. A seal according to claim 7 wherein a larger portion of the diaphragm part of the seal lies axially within the outer rigid reinforcing member.

10. A seal according to claim 8 wherein a larger portion of the diaphragm part of the seal lies radially inwardly of the outer rigid reinforcing member.

References Cited

UNITED STATES PATENTS

| | | | |
|---|---|---|---|
| 2,510,362 | 6/1950 | Anderson | 64—8 |
| 3,162,024 | 12/1964 | Breuer et al. | 64—8 |

FRED C. MATTERN, Jr., *Primary Examiner.*

F. D. SHOEMAKER, *Assistant Examiner.*